US012613069B2

(12) United States Patent
Kim et al.

(10) Patent No.: US 12,613,069 B2
(45) Date of Patent: Apr. 28, 2026

(54) METHOD FOR FORMING TEMPERATURE-RESPONSIVE HYDROPHILIC-HYDROPHOBIC CONVERSION SURFACE, AND TEMPERATURE-RESPONSIVE HYDROPHILIC-HYDROPHOBIC CONVERSION SURFACE AND HEAT EXCHANGER, USING SAME

(71) Applicant: IUCF-HYU (INDUSTRY-UNIVERSITY COOPERATION FOUNDATION HANYANG UNIVERSITY), Seoul (KR)

(72) Inventors: Dong Rip Kim, Seoul (KR); Hyeonho Lee, Daegu (KR); Jaehyeon Jeon, Seoul (KR); Jung Bin Yang, Jeonju-Si (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 212 days.

(21) Appl. No.: 18/290,235

(22) PCT Filed: May 11, 2022

(86) PCT No.: PCT/KR2022/006781
§ 371 (c)(1),
(2) Date: Jan. 11, 2024

(87) PCT Pub. No.: WO2022/240203
PCT Pub. Date: Nov. 17, 2022

(65) Prior Publication Data

US 2024/0295370 A1 Sep. 5, 2024

(30) Foreign Application Priority Data

May 13, 2021 (KR) ........................ 10-2021-0061884

(51) Int. Cl.
*F28F 13/18* (2006.01)
*B05D 3/10* (2006.01)
(Continued)

(52) U.S. Cl.
CPC ............ *F28F 13/185* (2013.01); *B05D 3/102* (2013.01); *B05D 5/04* (2013.01); *B05D 5/08* (2013.01);
(Continued)

(58) Field of Classification Search
CPC . B05D 1/18; B05D 3/102; B05D 5/00; B05D 5/04; B05D 5/08; B05D 2202/00;
(Continued)

(56) References Cited

U.S. PATENT DOCUMENTS

2012/0276334 A1* 11/2012 Fedynyshyn ............ B05D 5/08 264/293
2016/0131444 A1* 5/2016 Gruss ...................... F28F 13/18 29/890.03
(Continued)

FOREIGN PATENT DOCUMENTS

JP 10-026491 A 1/1998
JP 2018-046775 A 3/2018
(Continued)

OTHER PUBLICATIONS

International Search Report for PCT/KR2022/006781 dated Aug. 18, 2022.

*Primary Examiner* — Eric S Ruppert
*Assistant Examiner* — Hans R Weiland
(74) *Attorney, Agent, or Firm* — Sughrue Mion, PLLC

(57) ABSTRACT

A temperature-responsive hydrophilic-hydrophobic conversion surface has a surface property that is hydrophobic at a
(Continued)

low temperature and is converted to be hydrophilic when the temperature rises. Accordingly, by applying the conversion surface to the fins of a heat exchanger, frost formation can be delayed in a low temperature environment due to the hydrophobicity, and remaining meltwater can be easily dried due to the conversion of the surface from hydrophobic to hydrophilic when the temperature is raised for defrosting. Therefore, the surface property of the fins of a heat exchanger is automatically converted according to the temperature and exhibits only favorable advantages at respective temperatures, so that heat transfer performance and power efficiency of the heat exchange can be effectively improved.

14 Claims, 12 Drawing Sheets

(51) Int. Cl.

| | |
|---|---|
| ***B05D 5/04*** | (2006.01) |
| ***B05D 5/08*** | (2006.01) |
| ***B05D 7/14*** | (2006.01) |

(52) U.S. Cl.
CPC ................ *B05D 7/14* (2013.01); *F28F 13/18* (2013.01); *B05D 2202/00* (2013.01); *B05D 2401/10* (2013.01); *F28F 2245/02* (2013.01); *F28F 2245/04* (2013.01)

(58) Field of Classification Search
CPC ........ B05D 2401/10; B05D 7/14; C09D 5/16; C09D 5/1681; C09D 167/04; F28F 13/18; F28F 13/185; F28F 2245/02; F28F 2245/04
See application file for complete search history.

(56) References Cited

U.S. PATENT DOCUMENTS

| | | | | |
|---|---|---|---|---|
| 2016/0339424 | A1* | 11/2016 | Megaridis | B01L 3/502746 |
| 2017/0002230 | A1* | 1/2017 | Nowak | C08G 18/8083 |
| 2017/0234628 | A1* | 8/2017 | Frankiewicz | F28F 13/003 165/133 |
| 2019/0136073 | A1* | 5/2019 | Bake | C07F 7/1804 |
| 2020/0123294 | A1* | 4/2020 | Jiang | C08J 3/075 |

FOREIGN PATENT DOCUMENTS

| | | | |
|---|---|---|---|
| JP | 2018-507773 | A | 3/2018 |
| KR | 10-1999-0008019 | A | 1/1999 |
| KR | 10-2015-0008502 | A | 1/2015 |
| KR | 10-2017-0052276 | A | 5/2017 |
| KR | 10-2020-0065132 | A | 6/2020 |

* cited by examiner

METHOD FOR FORMING TEMPERATURE-RESPONSIVE HYDROPHILIC-HYDROPHOBIC CONVERSION SURFACE, AND TEMPERATURE-RESPONSIVE HYDROPHILIC-HYDROPHOBIC CONVERSION SURFACE AND HEAT EXCHANGER, USING SAME

CROSS REFERENCE TO RELATED APPLICATIONS

This application is a National Stage of International Application No. PCT/KR2022/006781 filed May 11, 2022, claiming priority based on Korean Patent Application No. 10-2021-0061884 filed May 13, 2021.

TECHNICAL FIELD

The present disclosure relates to a method for forming a temperature-responsive hydrophilic-hydrophobic conversion surface, and a temperature-responsive hydrophilic-hydrophobic conversion surface and a heat exchanger using the same, and more particularly, to a method for forming a temperature-responsive hydrophilic-hydrophobic conversion surface that can be effectively applied to the fins of a heat exchanger by enabling a reversible conversion that exhibits hydrophobicity at low temperatures and hydrophilicity at high temperatures, and a temperature-responsive hydrophilic-hydrophobic conversion surface and a heat exchanger using the same.

BACKGROUND ART

A heat exchanger is an apparatus that regulates heat to be transferred efficiently by temperature differences by using a refrigerant, and is used in a variety of fields such as refrigerators, air conditioners, power plants, cooling towers, computers, and automobiles.

The surface of the fins for enlarging the heat transfer surface of the heat exchanger is maintained at a low temperature by a refrigerant, and the surrounding temperature can be lowered through heat exchange with the outside. It is desirable to increase the surface area by forming the fin spacing of the heat exchanger to be dense in order to enhance heat exchange efficiency, but heat transfer performance deteriorates when moisture condenses on the surface of the fins with such a narrow spacing.

As a measure to resolve this issue, Korean Patent Publication No. 10-2015-0008502 proposed a technique to improve the drainage of a heat exchanger by applying a hydrophilic surface treatment agent containing a water-soluble resin, colloidal silica, alkoxysilane, a crosslinking agent, and water to the surface of the heat exchanger fins. However, if the surface of the heat exchanger fins is formed to be hydrophilic in this way, there may arise a problem that a frost layer is formed easily in low-temperature environments.

Since the efficiency of the heat exchanger decreases rapidly when a frost layer is formed on the surface of the heat exchanger fins, a process of stopping the supply of refrigerant into the tubes of the heat exchanger and raising the temperature, i.e., defrosting, can be performed to remove the frost. However, if defrosting takes a long time or is required frequently due to frequent frost formation, a high-performance heat exchanger cannot be manufactured. Accordingly, techniques for suppressing the formation of a frost layer on the surface of heat exchangers have been developed, and representatively, a technique for forming the surface of heat exchanger fins to be hydrophobic has been proposed.

For example, Korean Patent Publication No. 10-2017-0052276 describes that frost formation can be effectively delayed in a low-temperature environment and defrosting efficiency can be improved by depositing a superhydrophobic material on the metallic surface of a heat exchanger. If the surface of the heat exchanger fins exhibits a hydrophobicity in this way, frost formation can be prevented, and thus, there is an advantage that the amount of residual melt water in the defrosting process is small. However, residual melt water is likely to condense and adhere in the form of droplets to the hydrophobic surface after the defrosting process. These droplets decreased the heat transfer coefficient by convection and thus became a factor in deteriorating the heat transfer performance of the heat exchanger, and could accelerate frost re-formation, and there was a problem that a lot of time and electric power was needed to completely dry the condensate.

In this way, surface treatment techniques for heat exchanger fins can be divided into a technique of applying a hydrophilic surface to improve drainage and a technique of applying a hydrophobic surface to delay frost formation. However, hydrophilic or hydrophobic surfaces have a dual nature that can exhibit advantages in a certain temperature range and, on the other hand, can cause other problems as temperature conditions change. Therefore, there is a need to develop techniques for heat exchanger fins that can prevent the problem of frost formation at low temperatures and, at the same time, have the feature of easily drying residual melt water when defrosting, but the reality is that it is impossible to realize these advantages simultaneously with conventional surface treatment techniques.

DISCLOSURE

Technical Problem

It is an object of the present disclosure for solving such problems to provide a method for forming a temperature-responsive hydrophilic-hydrophobic conversion surface that can be effectively applied to the fins of a heat exchanger by enabling a reversible conversion that exhibits hydrophobicity at low temperatures and hydrophilicity at high temperatures.

It is another object of the present disclosure to provide a temperature-responsive hydrophilic-hydrophobic conversion surface formed using the above method.

It is yet another object of the present disclosure to provide a heat exchanger in which the temperature-responsive hydrophilic-hydrophobic conversion surface is applied to heat exchanger fins.

Technical Solution

There is provided a method for forming a temperature-responsive hydrophilic-hydrophobic conversion surface, comprising: forming a surface; and forming a coating layer by applying a coating solution containing a temperature-responsive phase transition polymer onto the surface having the microstructure.

In the present disclosure, the metal may comprise one or more selected from a group consisting of aluminum, aluminum alloys, magnesium, magnesium alloys, titanium, titanium alloys, copper, and copper alloys.

In the present disclosure, the surface treatment may be performed by one or more methods out of acid treatment, alkali treatment, plasma treatment, ultraviolet treatment, and exposure using a photoresist.

In the present disclosure, acid treatment is preferred as the surface treatment method, and the acid treatment is preferably performed by immersing the metal in a hydrochloric acid solution of a concentration of 1 to 6M for 1 to 30 minutes.

In the present disclosure, the aspect ratio of the microstructure may be 0.55 or more on the surface having the microstructure.

In the present disclosure, the arithmetic mean height Sa of the surface having the microstructure may be 1 or more.

In the present disclosure, the temperature-responsive phase transition polymer may be a lower critical solution temperature (LCST) polymer or an upper critical solution temperature (UCST) polymer.

In the present disclosure, the temperature-responsive phase transition polymer may comprise one or more lower critical solution temperature polymers selected from a group consisting of poly(N-isopropylacrylamide (pNIPAAm), poly(N,N-diethylacrylamide (pDEAM), poly(methyl vinyl ether) (pMVE), poly(2-ethoxyethyl vinyl ether) (pEOVE), poly(N-vinylcaprolactam) (pNVCa), poly(N-vinylisobutyramide) (pNVIBAM), poly(N-vinyl-n-butyramide) (pNVBAM), and poly(N-ethylmethacrylamide) (pNEMAM).

In the present disclosure, the temperature-responsive phase transition polymer may comprise one or more upper critical solution temperature polymers selected from a group consisting of polycaprolactone (PCL), poly(N-acryloylglycinamide-co-acrylonitrile) (poly(NAGA-AN), poly (N-acryloylasparaginamide) (PNAAAm), poly(2-hydroxyethylmethacrylate) (PHEMA), and poly-3-dimethyl (methacryloyloxyethyl)ammonium propane sulfonate (PDMAPS).

In the present disclosure, the concentration of the temperature-responsive phase transition polymer in the coating solution may be 5 to 100 g/L.

In the present disclosure, the thickness of the coating layer may be 0.5 to 5 μm.

The present disclosure also provides a temperature-responsive hydrophilic-hydrophobic conversion surface, comprising: a surface having a microstructure; and a coating layer formed on the surface having the microstructure and comprising a temperature-responsive phase transition polymer.

In the present disclosure, the temperature-responsive hydrophilic-hydrophobic conversion surface may have a water contact angle of 100° or more at temperatures of −10° C. or lower, and a water contact angle of 80° or less at temperatures of 50° C. or higher.

In the present disclosure, the temperature-responsive hydrophilic-hydrophobic conversion surface may be a surface of heat exchanger fins.

The present disclosure also provides a heat exchanger comprising heat exchanger fins having a temperature-responsive hydrophilic-hydrophobic conversion surface, wherein the temperature-responsive hydrophilic-hydrophobic conversion surface comprises a surface having a microstructure and a coating layer formed on the surface having the microstructure, wherein the coating layer comprises a temperature-responsive phase transition polymer.

Advantageous Effects

The temperature-responsive hydrophilic-hydrophobic conversion surface of the present disclosure has a feature that hydrophobicity is exhibited at low temperatures and the surface property is converted to hydrophilicity when the temperature rises. Accordingly, if the temperature-responsive hydrophilic-hydrophobic conversion surface of the present disclosure is applied to the fins of a heat exchanger, there is an effect of delaying frost formation owing to the hydrophobicity in low-temperature environments, and when the temperature rises for defrosting, the surface converts from hydrophobic to hydrophilic, allowing residual melt water to be easily dried. Therefore, according to the present disclosure, the surface property of the heat exchanger fins is automatically converted according to the temperature and only the favorable advantages are exhibited at each temperature, thereby effectively improving the heat transfer performance and power efficiency of the heat exchanger.

MODE FOR INVENTION

Hereinafter, specific aspects of the present disclosure will be described in more detail. Unless defined otherwise, all technical and scientific terms used herein have the same meaning as commonly understood by a person skilled in the art to which the present disclosure pertains. In general, the nomenclature used herein is well known and commonly used in the art.

The present disclosure relates to a temperature-responsive hydrophilic-hydrophobic conversion surface and a heat exchanger using the same.

As a method for improving the heat transfer performance of heat exchanger fins, conventionally, a method of applying a hydrophilic surface to improve the drainage of residual melt water or a method of applying a hydrophobic surface to delay frost formation were used. However, in the case of a hydrophilic surface, there arose a problem that frost formation progressed rapidly on the surface of the heat exchanger fins in a low-temperature environment and defrosting was difficult as the frost density was high. Further, in the case of a hydrophobic surface, there were problems that residual condensate tended to adhere in the form of large droplets near surface defects, which could actually accelerate frost formation, and a lot of time and electric power was needed to completely dry the residual condensate in the form of droplets in the defrosting process.

The present disclosure is an invention that can solve such problems of conventional heat exchanger fins, and can form a temperature-responsive hydrophilic-hydrophobic conversion surface by coating a temperature-responsive phase transition polymer on a surface having a microstructure.

Figure 1:
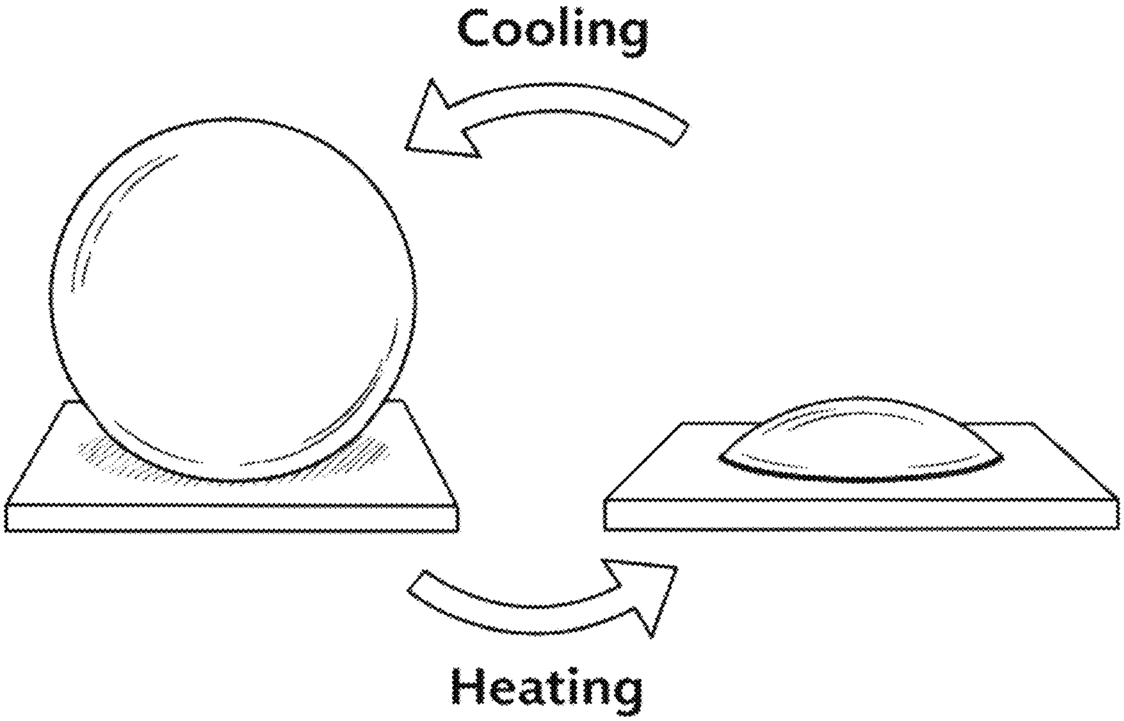
FIG. 1 shows the mechanism of surface property conversion of a temperature-responsive hydrophilic-hydrophobic conversion surface in accordance with the present disclosure.

FIG. 1 shows the mechanism of surface property conversion of a temperature-responsive hydrophilic-hydrophobic conversion surface in accordance with the present disclosure, and hydrophobicity in which the water contact angle increases is exhibited when the temperature is lowered, hydrophilicity in which the water contact angle decreases is exhibited when the temperature increases, and a reversible conversion between hydrophilicity and hydrophobicity is possible.

In the present disclosure, a surface having a microstructure can be formed by subjecting a metal to surface treatment, and a coating layer can be formed by applying a coating solution containing a temperature-responsive phase transition polymer onto the surface having the microstructure, thereby forming a temperature-responsive hydrophilic-hydrophobic conversion surface.

Figure 2:
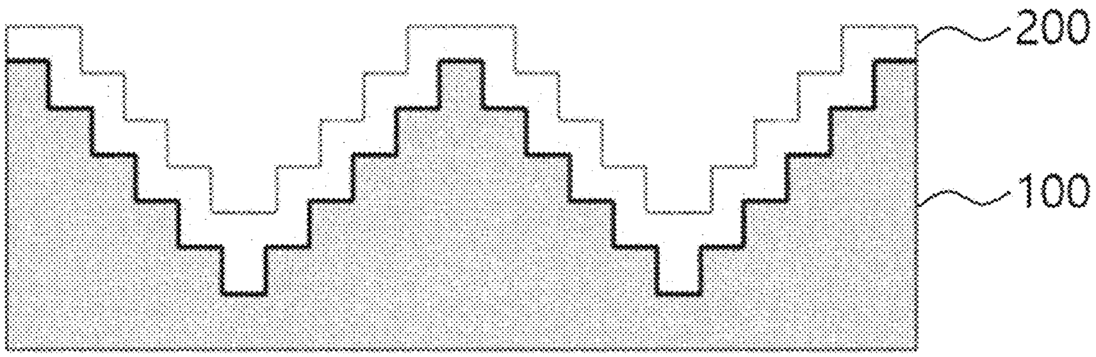
FIG. 2 shows a schematic diagram of a temperature-responsive hydrophilic-hydrophobic conversion surface in accordance with one embodiment of the present disclosure.

FIG. 2 shows a schematic diagram of a temperature-responsive hydrophilic-hydrophobic conversion surface in accordance with one embodiment of the present disclosure, and referring to FIG. 2, the temperature-responsive hydrophilic-hydrophobic conversion surface of the present disclosure may include a surface 100 having a microstructure and a coating layer 200 including a temperature-responsive phase transition polymer.

In the present disclosure, the metal may be a metal material mainly used for heat exchanger fins, and specifically, aluminum, magnesium, titanium, copper, or alloys thereof may be used. Out of these, aluminum or an aluminum alloy may be preferably used in terms of thermal conductivity, lightweightness, and processability.

In the present disclosure, the surface treatment of the metal may be carried out by wet-etching the surface of the metal or the surface of pre-produced heat exchanger fins with an acid solution or an alkaline solution. Hydrochloric acid, sulfuric acid, nitric acid, phosphoric acid, hydrofluoric acid, acetic acid solution, or the like may be used as the acid solution, and sodium hydroxide, potassium hydroxide, lithium hydroxide solution, or the like may be used as the alkaline solution. The wet-etching may be performed using a method of immersing the metal in a solution, a method of spraying a solution onto the metal surface, or the like.

In the present disclosure, wet-etching using an acid solution may be used as the surface treatment method for the metal. When an acid solution is used, a composite structure of micro- and nano-structures can be formed on the surface, and excellent hydrophobicity can be achieved by forming the slope of the microstructure to be steep. In particular, it is preferable in that the slope of the microstructure can be formed to be steep and a micro/nano-composite structure can be formed if hydrochloric acid is used as the acid solution.

At this time, the concentration of the acid solution may be 1 to 6M, preferably 2 to 4M, and the wet-etching time may be 1 to 30 minutes, preferably 5 to 25 minutes. If an acid solution with a low concentration in the above range is used, the arithmetic mean height may be appropriately adjusted by increasing the etching time. For example, if a hydrochloric acid solution of 1 to 4M is used, a surface having a microstructure may be formed by etching for 15 to 30 minutes.

In addition, it is also possible to use a dry-etching method such as plasma etching, ultraviolet etching, or a photoresist, or a molding method using a mold. Further, sandblasting that cuts a surface by spraying abrasive materials such as sand, alumina, silicon carbide, glass beads, and plastic powder from a nozzle may be used.

The surface treatment process may be performed one or more times, and if the process is performed two or more times, it is possible to form microstructures hierarchically or to form micro- and nano-structures compositely. In addition, hydrophobicity may be adjusted by adjusting the slope and roughness of the surface having the microstructure according to each surface treatment process. After forming the microstructure, a step of removing residues present on the surface, a drying step, and the like may be performed additionally for subsequent processes.

In the present disclosure, the surface having a microstructure refers to a surface having a surface roughness.

In the present disclosure, the slope of the microstructure may be determined by an aspect ratio. The aspect ratio refers to the value of h/w when the length between the bottoms on both sides in the irregularities of the microstructure (i.e., horizontal length) is defined as w and the length of the height of the structure from the bottom (i.e., vertical length) is defined as h. The average of the aspect ratios refers to a value obtained by dividing the sum of the aspect ratios of the respective microstructures and nanostructures by the number of structures.

In the present disclosure, the average of the aspect ratios is preferably 0.55 or more, and more preferably 0.7 or more. The lower the aspect ratio, the gentler the slope of the surface microstructure, and the higher the aspect ratio, the steeper the slope of the surface. If the aspect ratio of the microstructure is too low, it may be difficult to achieve excellent hydrophobicity even if the surface roughness is high. The higher aspect ratio is preferable to the extent that uniform formation of the coating layer is possible, but it may be adjusted to 10 or lower, for example, 6 or lower, taking into account the coatability.

Figure 3:
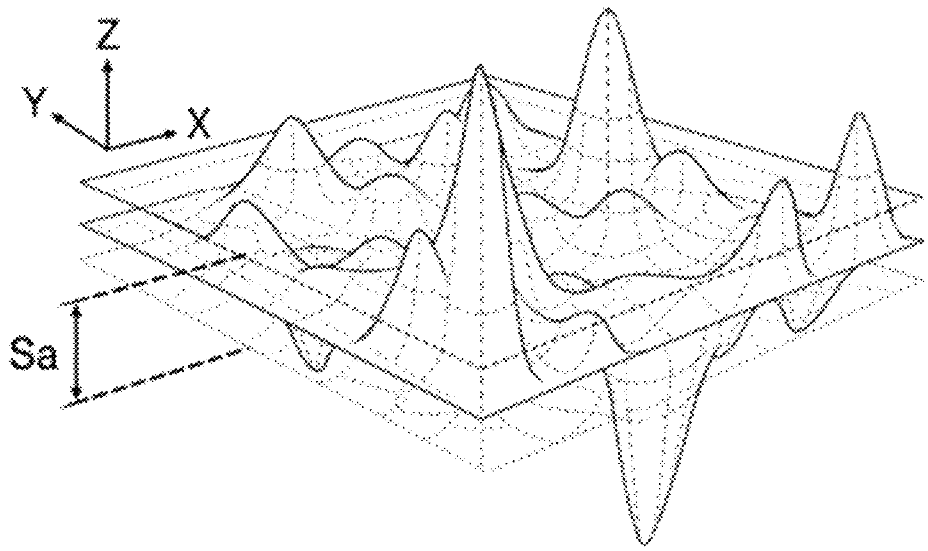
FIG. 3 shows an image illustrating the surface shape of a surface having a microstructure and an arithmetic mean height Sa on the surface.

The surface having the microstructure may be an uneven surface having an arithmetic mean height Sa of 0.5 or higher. FIG. 3 shows an image illustrating the surface shape of the surface having the microstructure and the arithmetic mean height Sa on the surface. The arithmetic mean height can be derived by measuring the height of the microstructure from the reference plane at each point in the measurement area and calculating according to Equation 1 below.

$$Sa = \frac{1}{A}\iint_A |Z(x, y)|dxdy \qquad \text{[Equation 1]}$$

Sa: Arithmetic mean height, A: Area of the measurement area, Z(x,y): Height from the reference plane Preferably, the arithmetic mean height may be 1 to 6. If the arithmetic mean height of the surface having the microstructure is too low, the hydrophilic-hydrophobic conversion performance with temperature may be modest, and it may be difficult to exhibit hydrophobicity at low temperatures. If the arithmetic mean height is too high, it may be difficult to form a coating layer on the microstructure.

Figure 4A:
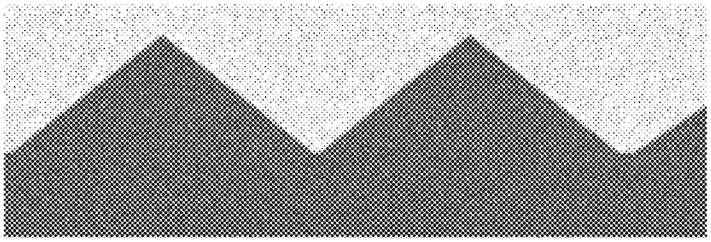
FIG. 4*a* to FIG. 4*d* are images of cross-sections of surfaces having (a) a microstructure of micro-level, (b) a nanostructure, (c) a micro/nano-composite structure, and (d) a micro/nano-composite structure in which the structure has a steep slope, respectively.
Figure 4B:
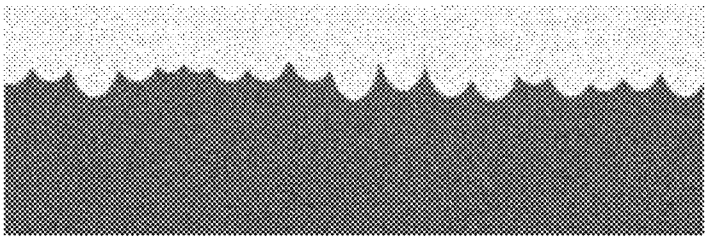
Figure 4C:
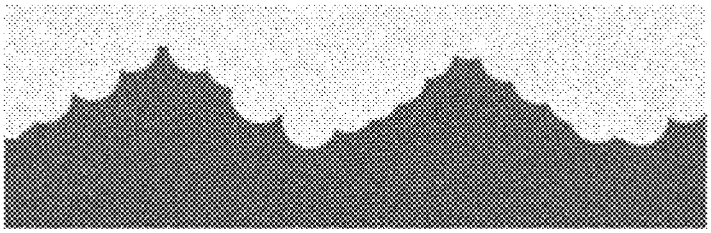
Figure 4D:
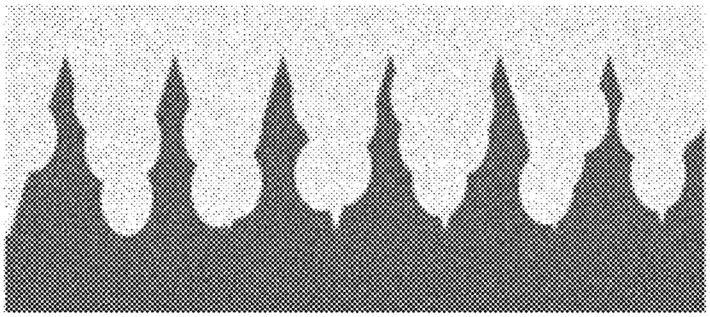

FIG. 4*a* to FIG. 4*d* are images of cross-sections of surfaces having various forms of microstructures. Specifically, FIG. 4*a* is one example of a surface on which a microstructure of micro-level is formed, and is obtained by imaging a surface having a low aspect ratio since the arithmetic mean height is high but the slope of the microstructure is gentle. For example, if sandblasting is performed as the surface treatment method, such a microstructure with a low aspect ratio is formed.

To complement this, a surface having a micro/nano-composite structure as shown in (c) may be formed by additionally forming a nanostructure such as (b) on the surface of the microstructure, thereby increasing the aspect ratio of the surface microstructure. For example, a surface in the form shown in (c) can be formed by treating a sand-blasted surface with a weak acid solution such as nitric acid or phosphoric acid. However, if the aspect ratio of the microstructure is too low, there may be a limit to the increase in the aspect ratio even if nanostructures are formed additionally, and in this case, it may be difficult to achieve excellent hydrophobicity even if the arithmetic mean height is high.

In the present disclosure, as the surface having a microstructure, it is desirable to use a surface having a steep slope, a micro/nano-composite structure, and a high arithmetic mean height, for example, a surface having a shape as in (d). In order to form the surface structure as in (d) above, wet-etching may be performed using a strong acid solution such as, for example, hydrochloric acid.

Once the surface having the microstructure is prepared, a temperature-responsive hydrophilic-hydrophobic conversion surface can be formed by forming a coating layer by applying a coating solution containing a temperature-responsive phase transition polymer onto the surface having the microstructure.

In the present disclosure, the temperature-responsive phase transition polymer refers to a polymer in which a reversible phase transition phenomenon occurs according to external temperatures. In general, temperature-responsive phase transition polymers are known to be applied to the field of in vivo drug delivery to regulate the release of drugs according to temperatures, or to water treatment apparatuses in the form of hydrogel by taking advantage of temperature-dependent water absorption and release properties, but there is no known technique for applying this to the surface of heat exchanger fins. The present disclosure is a breakthrough technique that allows the hydrophilicity and hydrophobicity of the surface of the heat exchanger fins to be converted automatically according to temperatures by applying the temperature-responsive phase transition polymer onto the surface having the microstructure, and problems with conventional heat exchanger fins can be resolved with a simple process.

In the present disclosure, the phase transition temperature of the temperature-responsive phase transition polymer may be −5 to 100° C., preferably 0 to 90° C., and more preferably 20 to 80° C. By selecting an appropriate type of temperature-responsive phase transition polymer by taking into account the defrosting cycle temperature of the heat exchanger and the phase transition temperature of the polymer, it is possible to adjust for the surface to be converted to hydrophilic in the defrosting cycle. In addition, it is preferable that the temperature-responsive phase transition polymer does not change significantly in the phase transition temperature by the polymer concentration in the coating solution. Further, it is desirable to use a polymer in which the hydrophilic-hydrophobic conversion is made stably regardless of the amount of water deposited on the heat exchanger fins.

The temperature-responsive phase transition polymer may be a lower critical solution temperature (LCST) polymer or an upper critical solution temperature (UCST) polymer. The lower critical solution temperature and the upper critical solution temperature refer to the lowest phase transition temperature and the highest phase transition temperature, respectively, in the concentration-temperature diagram for the phase transition.

As the LCST polymer, for example, poly(N-isopropylacrylamide (pNIPAAm), poly(N,N-diethylacrylamide (pDEAM), poly(methyl vinyl ether) (pMVE), poly(2-ethoxyethyl vinyl ether) (pEOVE), poly(N-vinylcaprolactam) (pNVCa), poly(N-vinylisobutyramide) (pNVIBAM), poly(N-vinyl-n-butyramide) (pNVBAM), poly(N-ethylmethacrylamide) (pNEMAM), and the like may be used. Out of these, it is desirable if pNIPAAm is used since the hydrophilic-hydrophobic conversion performance does not greatly depend on the polymer concentration in the coating solution.

As the UCST polymer, for example, polycaprolactone (PCL), poly(N-acryloylglycinamide-co-acrylonitrile) (poly (NAGA-AN), poly(N-acryloylasparaginamide) (PNAAAm), poly(2-hydroxyethylmethacrylate) (PHEMA), poly-3-dimethyl(methacryloyloxyethyl)ammonium propane sulfonate (PDMAPS), and the like may be used. Out of these, it is desirable if PCL, poly(NAGA-AN), or PNAAAm is used since the hydrophilic-hydrophobic conversion performance does not greatly depend on the polymer concentration in the coating solution. In particular, PCL may be preferably used taking into account the applicability such as the hydrophilic-hydrophobic conversion temperature suitable for use in a heat exchanger and a simple manufacturing process.

Table 1 below shows examples of temperature-responsive phase transition polymers that may be used in the present disclosure and their approximate hydrophilic-hydrophobic conversion temperatures.

TABLE 1

| Polymer | Conversion temperature |
|---|---|
| Poly(NAGA-AN) | 24° C. |
| PCL | 60° C. |
| PNAAAm | 28° C. |
| PHEMA | 22° C. |
| PDMAPS | 33° C. |
| pNIPAAm | 32° C. |

In the present disclosure, a coating solution may be produced by dissolving the temperature-responsive phase transition polymer in an organic solvent. As the organic solvent, chloroform, methanol, ethanol, propanol, butanol, hexane, ethylene carbonate, dimethyl sulfoxide, dimethylformamide, or the like may be used.

In the present disclosure, it is possible to adjust such that the hydrophilic-hydrophobic conversion performance does not vary significantly depending on the polymer concentration in the coating solution by using a polymer that is less dependent on the concentration as the temperature-responsive phase transition polymer. In other words, the dependence of the surface conversion performance on the polymer concentration in the coating solution can be reduced.

Therefore, the polymer concentration of the coating solution in the present disclosure can be freely adjusted and used within a wide concentration range, for example, within the range of 2 to 150 g/L. However, if the polymer concentration in the coating solution is too low, hydrophobicity may decrease due to discontinuity of the coating layer. On the other hand, if the polymer concentration is too high, hydrophobicity may decrease as the thickness of the coating layer increases and the coating layer covers the microstructure, and the hydrophilic-hydrophobic conversion performance may deteriorate. In view of this aspect, it is preferable to use a coating solution with a polymer concentration of 5 to 100 g/L.

As a method for applying the coating solution, it is preferable to use a method that can uniformly form a continuous coating layer on a surface having surface roughness, and for example, methods such as drop casting, dip coating, and spray coating may be used.

After application, additional steps such as a drying step and a cleaning step may be further performed as needed.

In the present disclosure, the thickness of the temperature-responsive polymer coating layer formed may be 0.5 to 5 μm, preferably 0.8 to 2 μm. Considering hydrophobicity and surface property conversion performance, a thinner coating layer is preferable, but if the coating layer is formed too thin, the discontinuity thereof may increase and it is vulnerable to external stimuli, making it prone to delamination. If the thickness of the coating layer is too thick, the microstructure beneath the coating layer may be buried by the coating layer, thereby decreasing hydrophobicity and surface property conversion performance.

The temperature-responsive hydrophilic-hydrophobic conversion surface of the present disclosure has a structure including a surface having a microstructure and a coating layer formed on the surface having the microstructure and including a temperature-responsive phase transition polymer. The temperature-responsive hydrophilic-hydrophobic conversion surface exhibits hydrophobicity at low temperatures and automatically converts to hydrophilic as the temperature rises. In the present disclosure, the hydrophobic surface refers to a surface with a water contact angle of 90° or more, and the hydrophilic surface refers to a surface with a water contact angle of less than 90°.

According to the present disclosure, excellent hydrophobicity with a water contact angle of 100° or more, preferably 120° or more, and more preferably 130° or more, can be exhibited at low temperatures, and it is also possible to realize a superhydrophobic surface with a water contact angle of 150° or more by adjusting the surface roughness of the surface having the microstructure, the polymer concentration in the coating solution, and the like. For example, the temperature-responsive hydrophilic-hydrophobic conversion surface of the present disclosure can exhibit excellent hydrophobicity as described above at a temperature of −10° C. or lower.

In addition, excellent hydrophilicity with a water contact angle of 80° or less, preferably 50° or less, and more preferably 45° or less, can be exhibited at high temperatures. For example, the temperature-responsive hydrophilic-hydrophobic conversion surface of the present disclosure can exhibit excellent hydrophilicity as described above at a temperature of 50° C. or higher.

If the hydrophilic-hydrophobic conversion surface of the present disclosure is applied to heat exchanger fins, the fin surface exhibits hydrophobicity and effectively delays frost formation in low-temperature environments, and when the defrosting cycle is activated and the temperature rises, the fin surface exhibits hydrophilicity and the residual melt water can be dried quickly as it exists in the form of a water film. Therefore, according to the present disclosure, the hydrophilicity and hydrophobicity of the surface of the heat exchanger fins can be automatically converted according to the temperature, and thus, only favorable advantages can be exhibited at each temperature. The present disclosure is a technique that does not require any additional equipment to improve the heat transfer efficiency of the heat exchanger and that can be applied to large areas with a simple process, and can be easily mass-produced and widely used in a variety of industries.

By utilizing the present disclosure, a heat exchanger with excellent heat transfer performance can be manufactured, and specifically, can be used beneficially in home appliance and mechanical fields, and the like, such as air source heat pump systems, air conditioners, and refrigerators.

EMBODIMENTS

The present disclosure will be described in more detail through embodiments below. However, these embodiments show some experiment methods and compositions in order to describe the present disclosure by way of example, and the scope of the present disclosure is not limited to these embodiments.

Preparation Example 1: Forming Temperature-Responsive Hydrophilic-Hydrophobic Conversion Surface A microstructure was formed on the surface of aluminum by wet-etching by immersing the aluminum in hydrochloric acid of a concentration of 2.5M for 15 minutes. Polycaprolactone (PCL) was mixed in a mixture containing methanol and chloroform in a volume ratio of 1:3 and dissolved via a stirrer, thereby producing a coating solution with a concentration of 5 g/L. By applying the coating solution to the aluminum with the microstructure formed on the surface thereof by the method of dip coating, and then drying it on a hot plate (or in an oven) at 120° C. and evaporating the mixture, a temperature-responsive hydrophilic-hydrophobic conversion surface was formed.

Experiment Example 1: Surface Property Check and Frost Formation/Defrosting Simulation Test A microstructure with an arithmetic mean height Sa of 3 was formed on the aluminum surface according to the method of Production Example 1, and a temperature-responsive hydrophilic-hydrophobic conversion surface was formed by applying the coating solution of a concentration of 5 g/L. For this, changes in surface properties in high-temperature environments were observed, and frost formation simulation experiments at low temperatures and defrosting simulation experiments at high temperatures were conducted.

The changes in surface properties in a high-temperature environment were observed at a temperature of 60° C., the temperature condition for the frost formation simulation experiment was set to −10° C., the temperature condition for the defrosting simulation experiment was set to 60° C., and changes in the surface over time were checked. For comparison, the same experiment was conducted on a superhydrophobic surface (water contact angle >130°) and a hydrophilic surface (water contact angle <30°.

Figure 5:
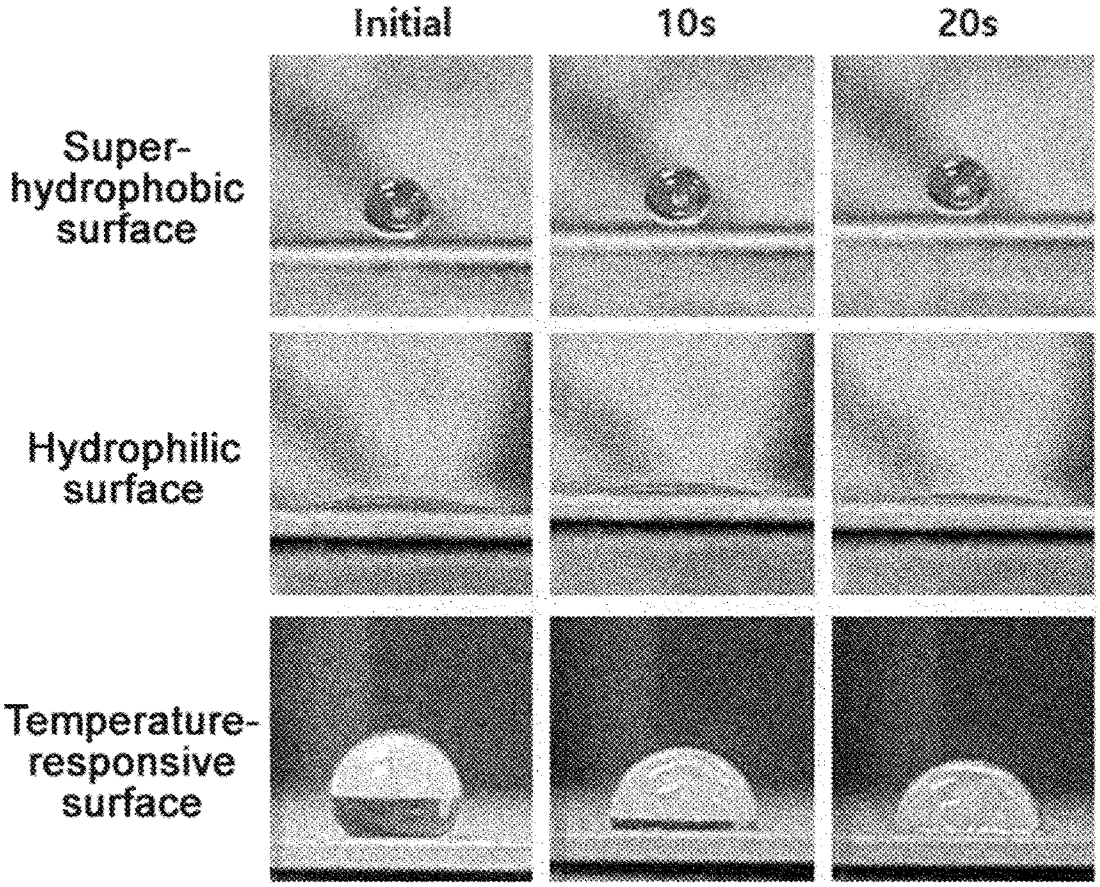
FIG. 5 is photographs obtained by capturing changes in surface properties for a temperature-responsive hydrophilic-hydrophobic conversion surface, a hydrophilic surface, and a superhydrophobic surface produced in one embodiment of the present disclosure.

FIG. 5 is photographs obtained by capturing the changes in surface properties over time in a high-temperature environment. Referring to FIG. 5, it was confirmed that the shape of the droplets was maintained without any change in the contact angle in the case of the superhydrophobic surface, and the residual melt water was seen evaporating as the water film decreased in the case of the hydrophilic surface. On the other hand, in the case of the temperature-responsive hydrophilic-hydrophobic conversion surface in accordance with the present disclosure, it was confirmed that as the water contact angle of the droplets decreased over time, the droplets turned into the form of a water film and evaporated.

Figure 6:
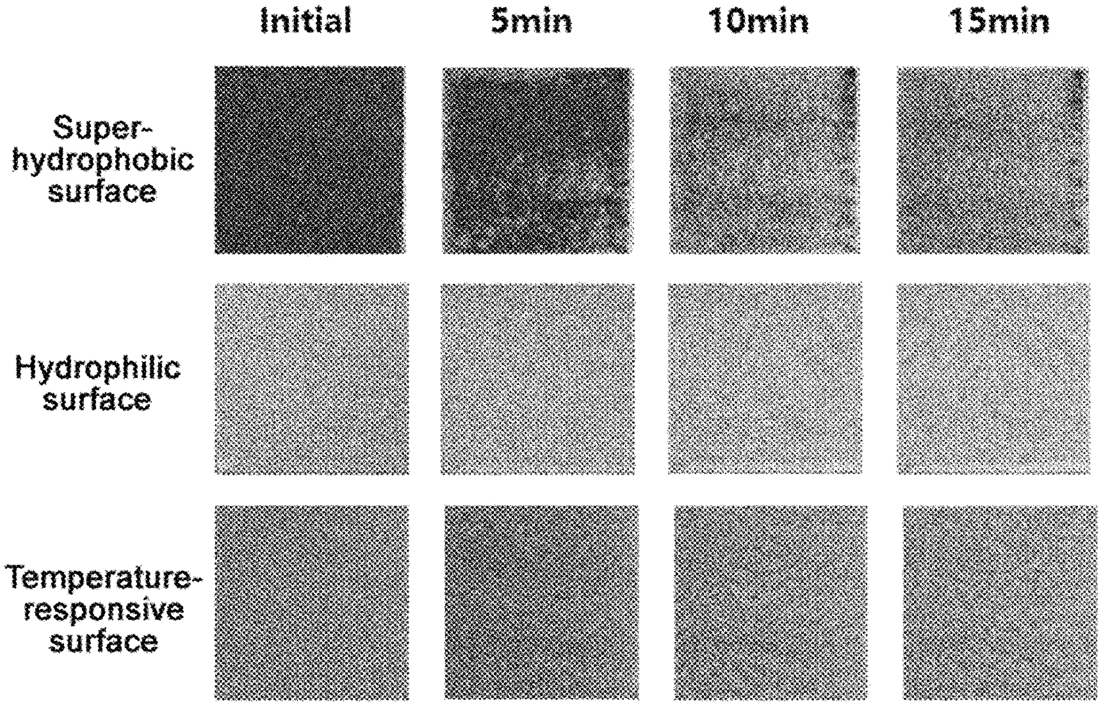
FIG. 6 is photographs obtained by capturing surface changes over time in a frost formation simulation experiment for the temperature-responsive hydrophilic-hydrophobic conversion surface, the hydrophilic surface, and the superhydrophobic surface produced in one embodiment of the present disclosure.
Figure 7:
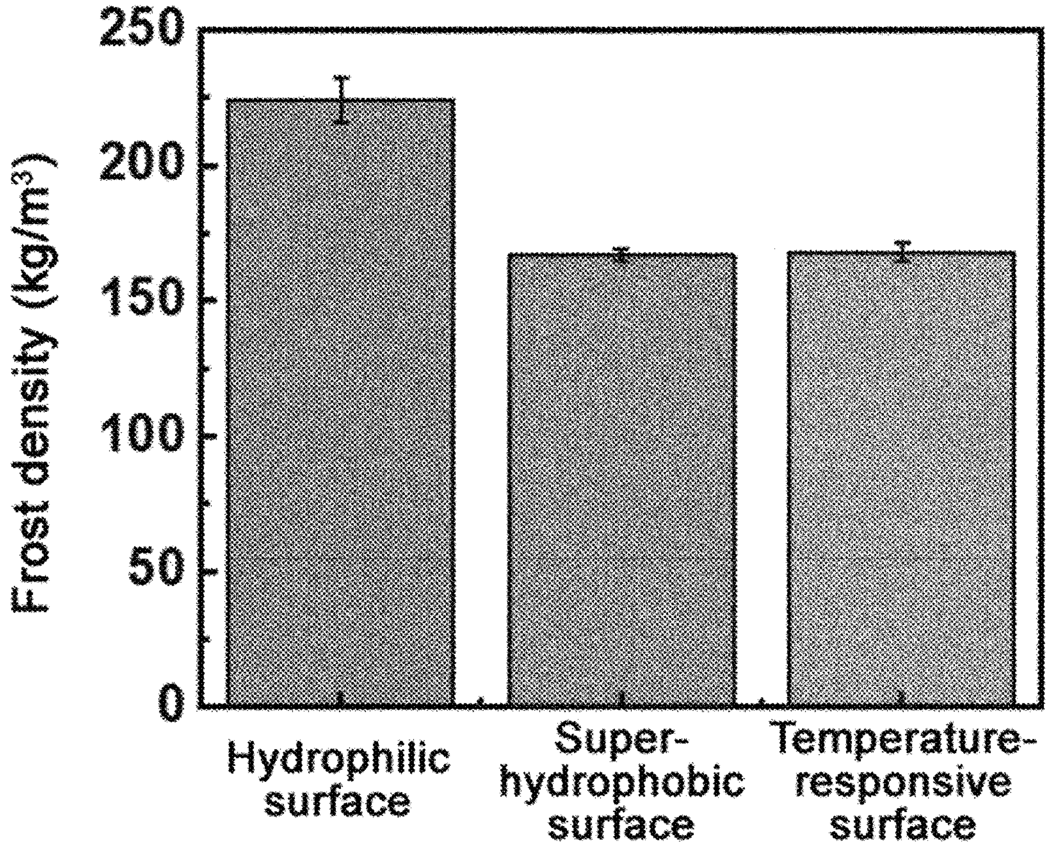
FIG. 7 is a graph of the results obtained by measuring frost densities in the frost formation simulation experiment for the temperature-responsive hydrophilic-hydrophobic conversion surface, the hydrophilic surface, and the superhydrophobic surface produced in one embodiment of the present disclosure.

In the frost formation simulation experiment, photographs of the surfaces over time are shown in FIG. 6, and frost densities were measured and shown in FIG. 7. From the results in FIGS. 6 and 7, it was confirmed that frost was formed after condensation occurred in the form of droplets, and the frost density was relatively low in the case of the superhydrophobic surface, whereas condensation occurred in the form of a water film, frost was formed to cover the entire surface, and the frost density was high in the case of the hydrophilic surface. In the case of the temperature-responsive hydrophilic-hydrophobic conversion surface in accordance with the present disclosure, it was confirmed that frost was formed after condensation in the form of droplets occurred in the same way as the superhydrophobic surface, and it was confirmed that the frost density was low at the level similar to that of the superhydrophobic surface.

Figure 8:
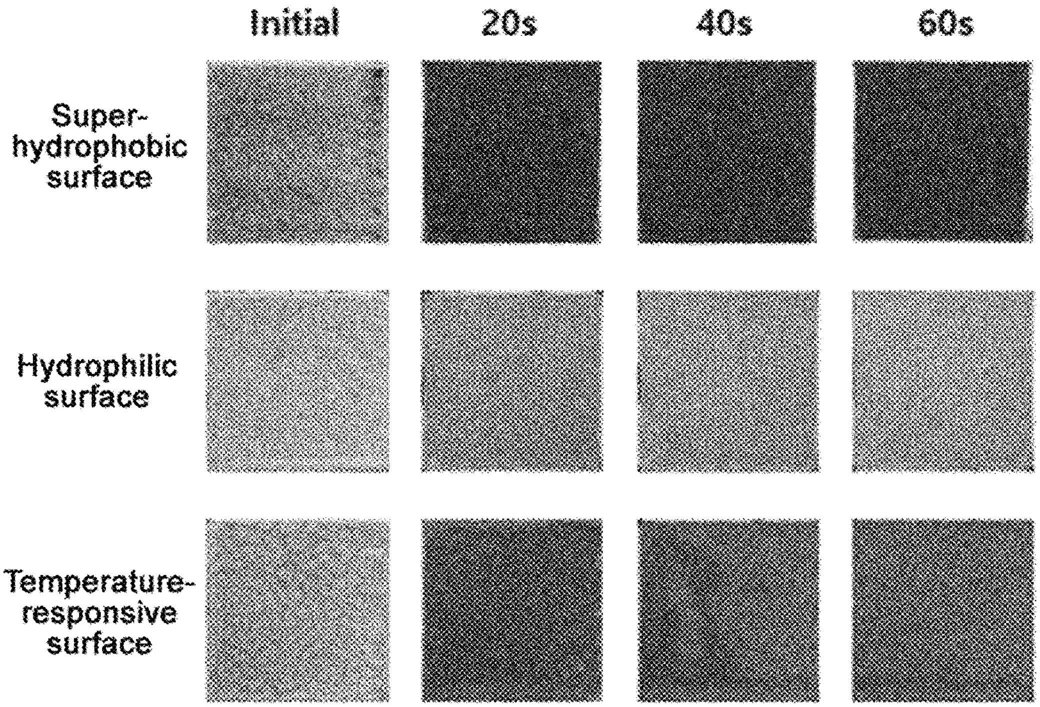
FIG. 8 is photographs obtained by capturing surface changes over time in a defrosting simulation experiment for the temperature-responsive hydrophilic-hydrophobic conversion surface, the hydrophilic surface, and the superhydrophobic surface produced in one embodiment of the present disclosure.
Figure 9:
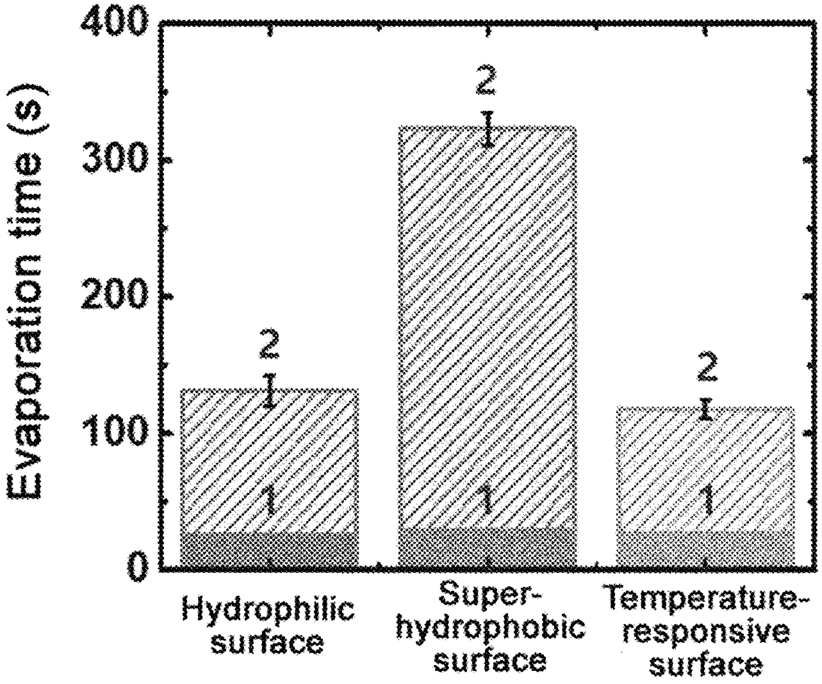
FIG. 9 is a graph of the results obtained by measuring droplet evaporation times in the defrosting simulation experiment for the temperature-responsive hydrophilic-hydrophobic conversion surface, the hydrophilic surface, and the superhydrophobic surface produced in one embodiment of the present disclosure.
Figure 10A:
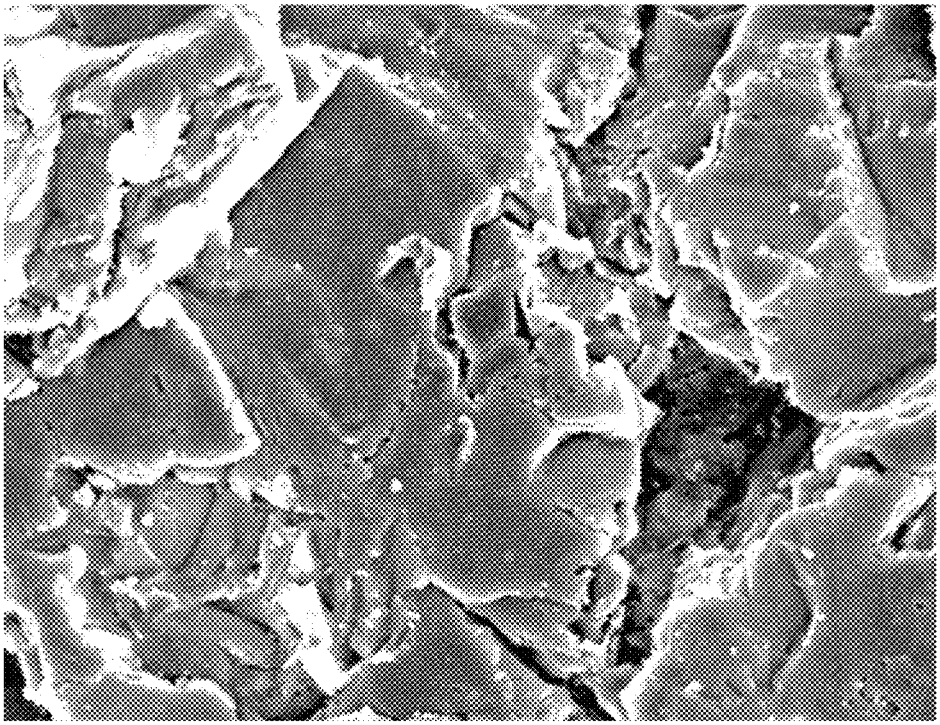
FIG. 10*a* to FIG. 10*d* show SEM images of surface microstructures before application of a coating solution in the temperature-responsive hydrophilic-hydrophobic conversion surface produced in one embodiment of the present disclosure, and represent SEM images of surface treated by (a) sandblast, (b) nitric acid/phosphoric acid etching, (c) sandblast and nitric acid/phosphoric acid etching, (d) hydrochloric acid etching, respectively.
Figure 10B:
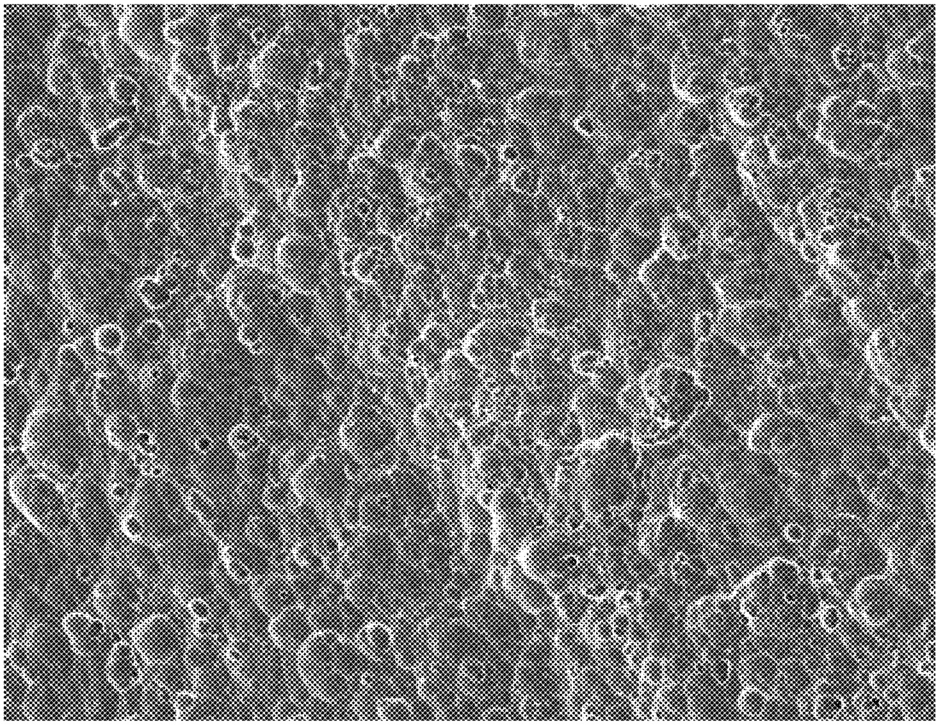
Figure 10C:
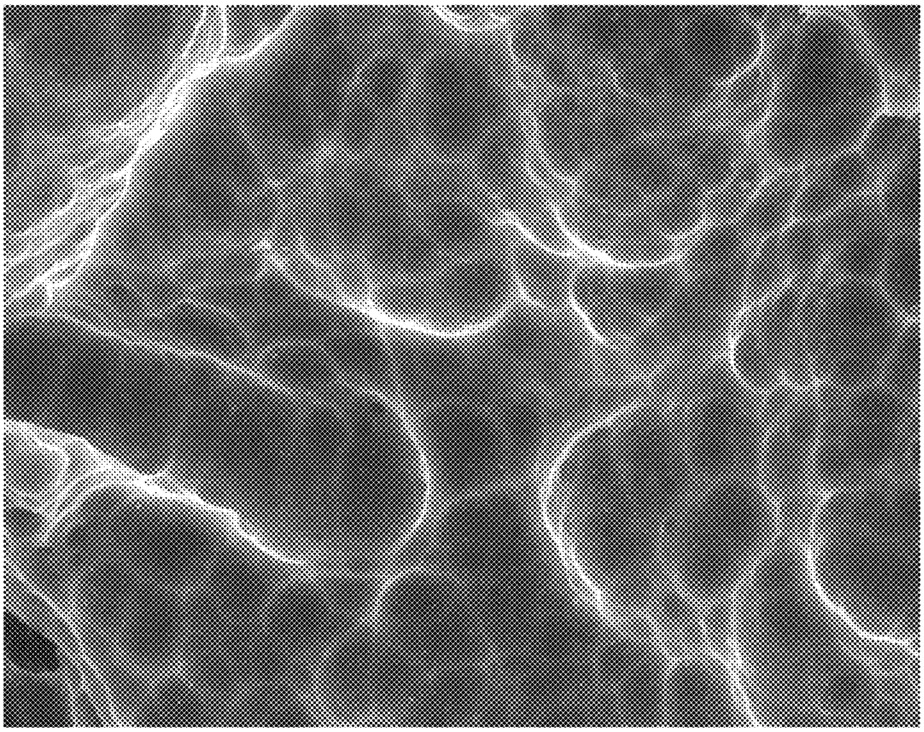
Figure 10D:
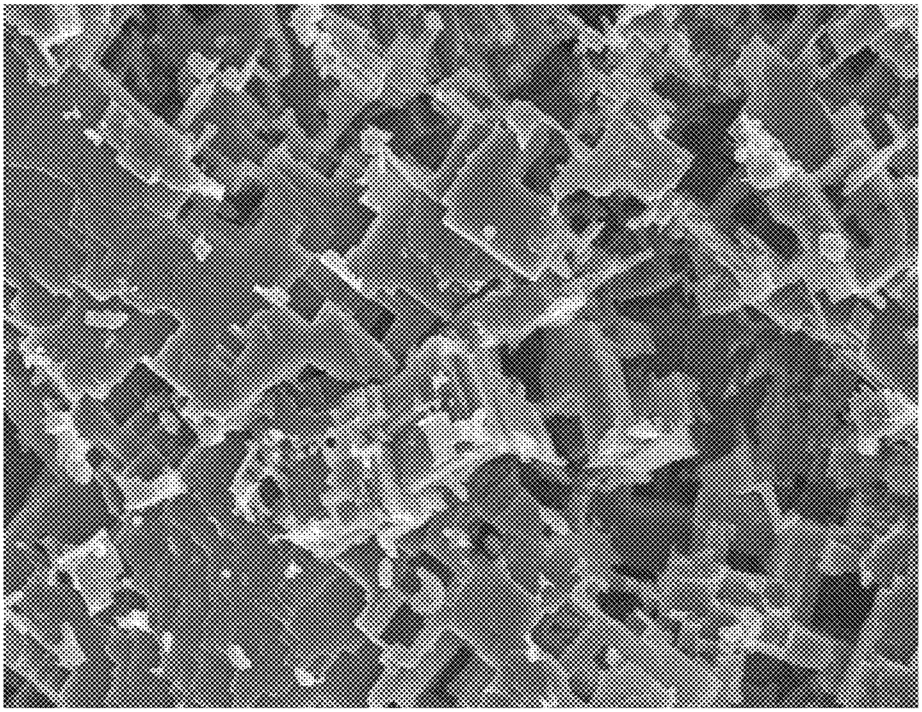
Figure 11A:
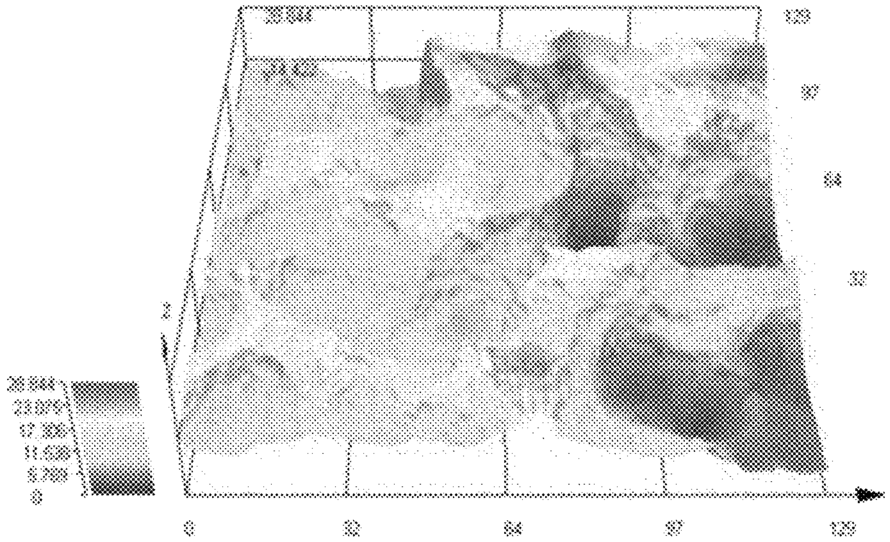
FIG. 11*a* and FIG. 11*b* show CLSM images of the surface microstructures before the application of the coating solution in the temperature-responsive hydrophilic-hydrophobic conversion surface produced in one embodiment of the present disclosure, and represent CLSM images of the surface treated by (a) sandblast and nitric acid/phosphoric acid etching, and (b) hydrochloric acid etching, respectively.
Figure 11B:
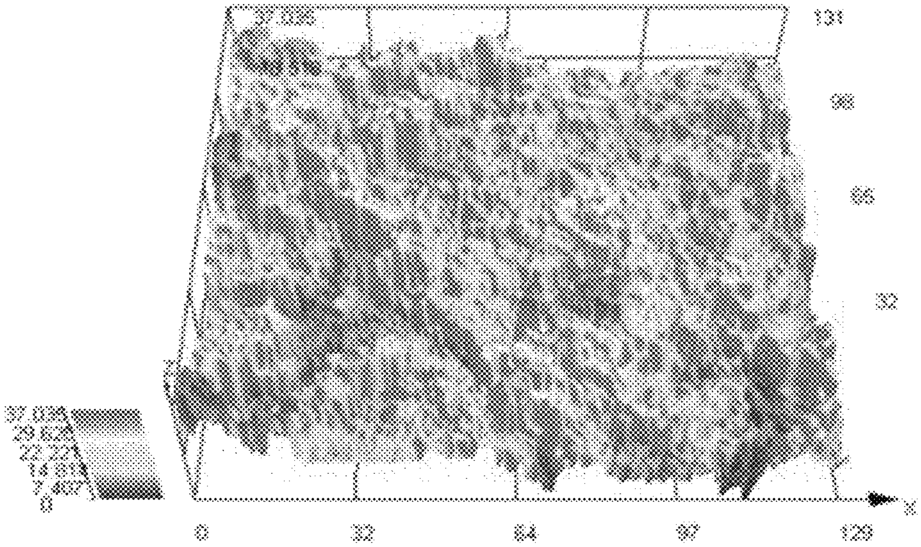
Figure 12A:
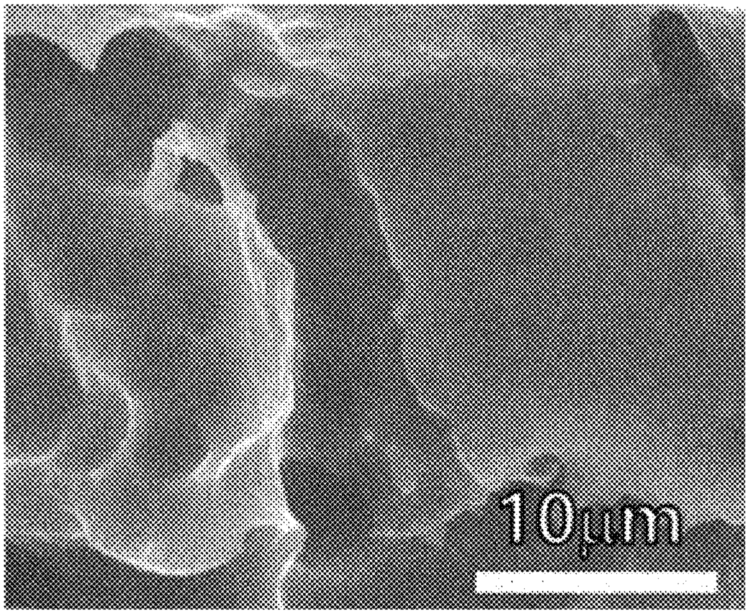
FIG. 12*a* and FIG. 12*b* show SEM images of the surface microstructures after forming a coating layer in the temperature-responsive hydrophilic-hydrophobic conversion surface produced in one embodiment of the present disclosure, and represent SEM images of the after-coating surface treated by (a) sandblast and nitric acid/phosphoric acid etching, and (b) hydrochloric acid etching, respectively.
Figure 12B:
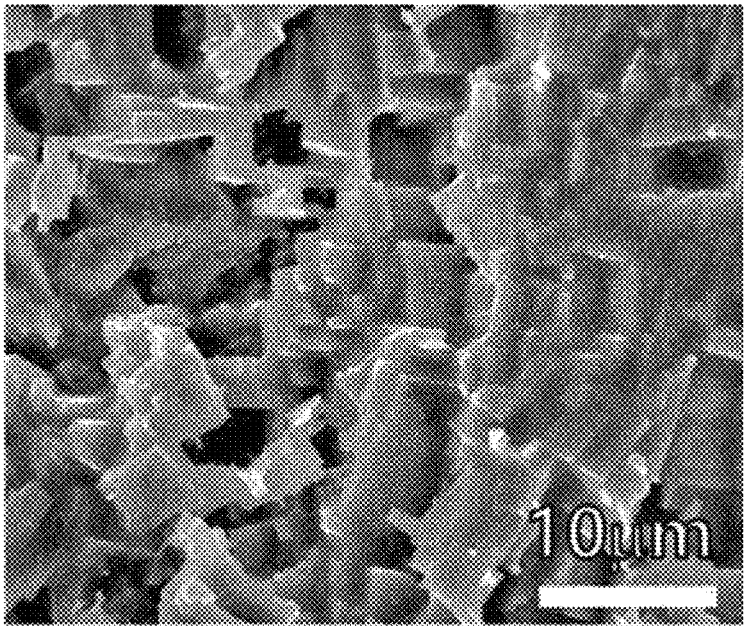

Further, in the defrosting simulation experiment, photographs of the surfaces over time are shown in FIG. 8, and evaporation times were measured and shown in FIG. 9. From the results in FIGS. 8 and 9, it was confirmed that water drops in the form of droplets adhered to surface defects and the surface drying time was long in the case of the superhydrophobic surface, and it was confirmed that a water film was formed over the entire surface and the surface drying time was relatively short in the case of the hydrophilic surface. In the case of the temperature-responsive hydrophilic-hydrophobic conversion surface in accordance with the present disclosure, it was confirmed that a small number of droplets were adhered initially, but the droplets spread out in the form of a water film as the temperature rose, and it was confirmed that the surface drying time was short.

Experiment Example 2: Comparison Experiment of Shapes of Surfaces Having Microstructures In order to observe changes in the shape of surfaces according to the method of forming microstructures, surface specimens (a) to (d) with microstructures formed on the surface thereof using a variety of methods were prepared, and the shape and aspect ratio of each surface were compared.

Specifically, a surface specimen (a) with a microstructure formed on the surface thereof was prepared by sandblasting by spraying a #120 abrasive onto aluminum at a pressure of 0.5 MPa.

In addition, a specimen (b) with a nanostructure formed thereon was prepared by wet-etching by immersing aluminum in a mixture of nitric acid and phosphoric acid (1:1) of a concentration of 20 vol % for 3 minutes.

A microstructure was formed by spraying a #120 abrasive onto aluminum at a pressure of 0.5 MPa, and heat-treated on a hot plate at 180° C. for 10 minutes. Thereafter, a nanostructure was formed by wet-etching by immersion in a mixture of nitric acid and phosphoric acid (1:1) of a concentration of 20 vol % for 3 minutes, thereby preparing a specimen (c) having micro/nano-structures on the surface thereof.

By wet-etching by immersing aluminum in hydrochloric acid of a concentration of 2.5M for 15 minutes according to the method of Production Example 1, specimen (d) was prepared by forming micro/nano-structures on the surface of the aluminum.

Photographs of each surface specimen are shown in FIG. 10*a* to FIG. 10*d*. In addition, the aspect ratio AR and arithmetic mean height Sa of each specimen were measured, a temperature-responsive hydrophilic-hydrophobic conversion surface was formed by coating a PCL coating solution of a concentration of 5 g/L according to the method of Production Example 1, then the water contact angle at 25° C. was measured, and the results are shown in Table 2 below.

TABLE 2

| Specimen | Surface treatment method | Average AR | Sa | Water contact angle after coating PCT |
|---|---|---|---|---|
| (a) | Sandblast | 0.22 | 4.02 | 92° |
| (b) | Nitric acid/phosphoric acid etching | 0.61 | 0.31 | 91° |
| (c) | 1) Sandblast<br>2) Nitric acid/phosphoric acid etching | 0.46 | 3.09 | 96° |
| (d) | Hydrochloric acid etching | 0.83 | 3 | 151° |

Referring to FIG. 10*a* to FIG. 10*d* and Table 2 above, it can be seen that the shape of the surface can be adjusted depending on the etching method, and the surface properties vary accordingly.

Specifically, a surface with a high arithmetic mean height but a gentle slope of the microstructure was formed in the case of specimen (a), and a surface with a relatively high aspect ratio of the microstructure but a low arithmetic mean height was formed in the case of specimen (b). In the case of the above specimens (a) and (b), the water contact angles at 25° C. were 91° and 92°, respectively, when the coating layer was formed, showing little hydrophobicity.

For specimen (c), the aspect ratio of the microstructure was somewhat improved while ensuring the arithmetic mean height to be high at or more than 3 by combining the surface properties of specimens (a) and (b) above, but the aspect ratio did not reach 0.55 and excellent hydrophobicity was not exhibited.

On the other hand, in the case of specimen (d), a surface with an arithmetic mean height similar to that of specimen (c) but an aspect ratio of 0.55 or more, i.e., a large slope of the microstructure, was formed, and due to such a difference in aspect ratio, superhydrophobicity with a water contact angle exceeding 150° after forming the coating layer was exhibited.

Through the results above, it was confirmed that it was important to adjust the arithmetic mean height and aspect ratio of the surface having the microstructure in order to form the temperature-responsive hydrophilic-hydrophobic conversion surface that exhibited excellent hydrophobicity at low temperatures. In particular, from the results that the hydrophobicity differed significantly depending on the aspect ratio of the surfaces in specimens (c) and (d) that had similar arithmetic mean heights, it was confirmed that not only the surface roughness but also the slope of the microstructure had a significant effect on the hydrophobicity.

FIG. 11*a* and FIG. 11*b* and FIG. 12*a* and FIG. 12*b* show confocal laser scanning microscope photographs and SEM photographs after PCL coating of the surface specimens (c) and (d), respectively, and in FIG. 11*a* and FIG. 11*b* and FIG. 12*a* and FIG. 12*b*, (a) corresponds to specimen (c) in FIG. 10*a* to FIG. 10*d*, and (b) corresponds to specimen (d) in FIG. 10*a* to FIG. 10*d*. Referring to FIGS. 11*a* and FIGS. 11*b* and 12*a* and FIG. 12*b*, it was confirmed that the Sa values of the respective specimens were not different significantly but the microstructure of specimen (d) had a steeper slope in terms of aspect ratio.

According to the above results, it was confirmed that the hydrophobicity could vary depending on the aspect ratio of the surface even if the arithmetic mean heights of the surfaces were similar, and it was difficult to ensure excellent hydrophobicity at low temperatures even if the arithmetic mean height was adjusted to be high if the aspect ratio was too low. Referring to these results, it can be seen that a higher aspect ratio of the surface microstructure is desirable in order to effectively prevent frost formation by improving hydrophobicity at low temperatures.

Experiment Example 3: Surface Property Conversion Test by Arithmetic Mean Height Samples were produced by applying coating solutions of various concentrations to the surfaces of four types of microstructures with different arithmetic mean heights, and the hydrophilic-hydrophobic conversion performance was checked by measuring the water contact angles at low and high temperatures.

An aluminum surface on which no etching was performed was prepared, and surfaces of four types of microstructures with different arithmetic mean heights were prepared according to the method of Production Example 1 but by adjusting the concentration of hydrochloric acid and the immersion time as shown in Table 3 below.

TABLE 3

| Hydrochloric acid concentration | Etching time | Arithmetic mean height |
|---|---|---|
| — | — | Sa < 1 |
| 6M | 1 Minute | 1 ≤ Sa ≤ 1.4 |
| 4.8M | 11 Minutes | 1.8 ≤ Sa ≤ 2.6 |
| 2.5M | 15 Minutes | 2.6 < Sa |

Coating solutions with PCL concentrations of 5, 30, 60, and 100 g/L, respectively, were prepared and coated on each microstructure surface, thereby producing hydrophilic-hydrophobic conversion member samples. The water contact angles were measured at a low temperature (25° C.) and a high temperature (60° C.) for each sample, and the results are shown in Table 4.

TABLE 4

| Concentration (g/L) | Temperature | Sa < 1 | 1 ≤ Sa ≤ 1.4 | 1.8 ≤ Sa ≤ 2.6 | 2.6 < Sa |
|---|---|---|---|---|---|
| 5 | Low temperature | 85.3° ± 2.1° | 136.3° ± 1.7° | 139.4° ± 1.5° | 150.5° ± 2.5° |
| | High temperature | 75.0° ± 1.2° | 39.3° ± 2.8° | 37.4° ± 2.3° | 41.0° ± 2.1° |
| 30 | Low temperature | 84.4° ± 3.7° | 139.6° ± 2.2° | 138.0° ± 1.9° | 138.8° ± 3.8° |
| | High temperature | 71.7° ± 2.1° | 37.6° ± 1.2° | 40.2° ± 1.4° | 33.5° ± 1.3° |
| 60 | Low temperature | 87.1° ± 1.1° | 139.6° ± 1.5° | 137.4° ± 1.7° | 132.4° ± 0.9° |
| | High temperature | 69.5° ± 2.1° | 35.1° ± 2.3° | 34.1° ± 1.9° | 37.7° ± 1.4° |
| 100 | Low temperature | 85.5° ± 3.0° | 137.6° ± 2.4 | 138.2° ± 2.0° | 129.4° ± 1.1° |
| | High temperature | 68.3° ± 3.5° | 36.8° ± 1.0° | 37.0° ± 1.1° | 30.9° ± 2.2° |

From the results in Table 4 above, it was confirmed for the hydrophilic-hydrophobic conversion surface in accordance with the present disclosure that the water contact angle decreased as the temperature increased.

In particular, it was confirmed that the samples produced using microstructure surfaces with an arithmetic mean height Sa of 1 or more exhibited high hydrophobicity with a water contact angle of about 130° or more at low temperatures and, on the other hand, exhibited high hydrophilicity as the water contact angle was reduced significantly to about 40° or less at high temperatures.

Further, when comparing the water contact angle measurements according to each polymer concentration, it was confirmed that the hydrophilic-hydrophobic conversion performance did not change much depending on the concentration in the range of 5 to 100 g/L.

From the foregoing, it was confirmed that the temperature-responsive hydrophilic-hydrophobic conversion surface of the present disclosure exhibited hydrophobicity at low temperatures and converted to hydrophilic when the temperature rose. In particular, it was confirmed that using a surface with an arithmetic mean height Sa of 1 or more as the microstructure surface and applying a coating solution with a polymer concentration of 5 to 100 g/L yielded desirable results in terms of surface conversion performance.

Experiment Example 4: Surface Property Conversion Test by Polymer Concentration

The hydrophilic-hydrophobic conversion performance was checked by measuring the thicknesses and the water contact angles at low and high temperatures for the samples produced using coating solutions with different polymer concentrations.

Samples were produced by forming microstructure surfaces with arithmetic mean heights exceeding 2.6 according to the method of Production Example 1 and applying coating solutions with PCL concentrations of 2, 5, 30, 60, 100, and 120 g/L, respectively. The results obtained by measuring the thickness of the coating layer with a confocal laser scanning microscope and measuring the water contact angle at low and high temperatures are shown in Table 5.

TABLE 5

| Concentration | Thickness | Water contact angle | |
|---|---|---|---|
| (g/L) | (μm) | Low temperature | High temperature |
| 2 | 0.44 ± 0.19 | 134.9° ± 15.5° | 39.2° ± 5.4° |
| 5 | 0.94 ± 0.13 | 150.5° ± 2.5° | 41.0° ± 2.1° |
| 30 | 1.20 ± 0.13 | 138.8° ± 3.8° | 33.5° ± 1.3° |
| 60 | 1.49 ± 0.23 | 132.4° ± 0.9° | 37.7° ± 1.4° |
| 100 | 1.96 ± 0.29 | 129.4° ± 1.1° | 30.9° ± 2.2° |
| 120 | 2.38 ± 0.35 | 98.4° ± 3.3° | 67.4° ± 1.9° |

According to the results in Table 5 above, all samples exhibited a hydrophilic-hydrophobic conversion property in which the water contact angle decreased as the temperature increased in general. Out of these, it was confirmed that the hydrophilic-hydrophobic conversion property was very excellent, with the difference in water contact angle at low and high temperatures being a minimum of 94.7 and a maximum of 109.5 when the concentration of the coating liquid is 100 g/L or less. In particular, it was confirmed that the lower the concentration, the thinner the thickness was formed, and superhydrophobicity with a water contact angle of 150° or more was exhibited at low temperatures when the coating solution with a concentration of 5 g/L was applied. However, when the concentration was the lowest at 2 g/L, the results showed that the hydrophobicity was somewhat reduced due to the discontinuity of the coating layer and the deviation of the contact angle was large.

In addition, when the concentration of the coating solution increased to 120 g/L, the hydrophobicity decreased due to the increase in the thickness of the coating layer and the difference in water contact angle between low and high temperatures was not that large at 31°.

From the above, results were found that the hydrophilic-hydrophobic surface conversion property was excellent and stable when the concentration of the coating solution was 5 to 100 g/L.

Preparation Example 2: Forming Temperature-Responsive Hydrophilic-Hydrophobic Conversion Surface By sandblasting by spraying a #120 abrasive onto aluminum at a pressure of 0.5 MPa, a microstructure was formed on the surface. Micro/nano-structures were formed on the surface of the aluminum by heat treatment on a hot plate at 180° C. for 10 minutes, followed by wet-etching by immersion in hydrochloric acid of a concentration of 2.5M for 10 minutes. Next, a nanostructure was formed by wet-etching by immersion in a mixture of nitric acid and phosphoric acid (1:1) of a concentration of 20 vol % for 3 minutes, thereby forming a surface with an arithmetic mean height exceeding 2.6 and an aspect ratio of 0.55 or more as the surface having micro/nano-structures.

Polycaprolactone (PCL) was mixed in a mixture containing methanol and chloroform in a volume ratio of 1:3 and dissolved via a stirrer, thereby producing a coating solution with a concentration of 5 g/L. By applying the coating solution to the aluminum with the microstructure formed on the surface thereof by the method of dip coating, and then drying it on a hot plate (or in an oven) at 120° C. and evaporating the mixture, a temperature-responsive hydrophilic-hydrophobic conversion surface was formed.

Figure 13:
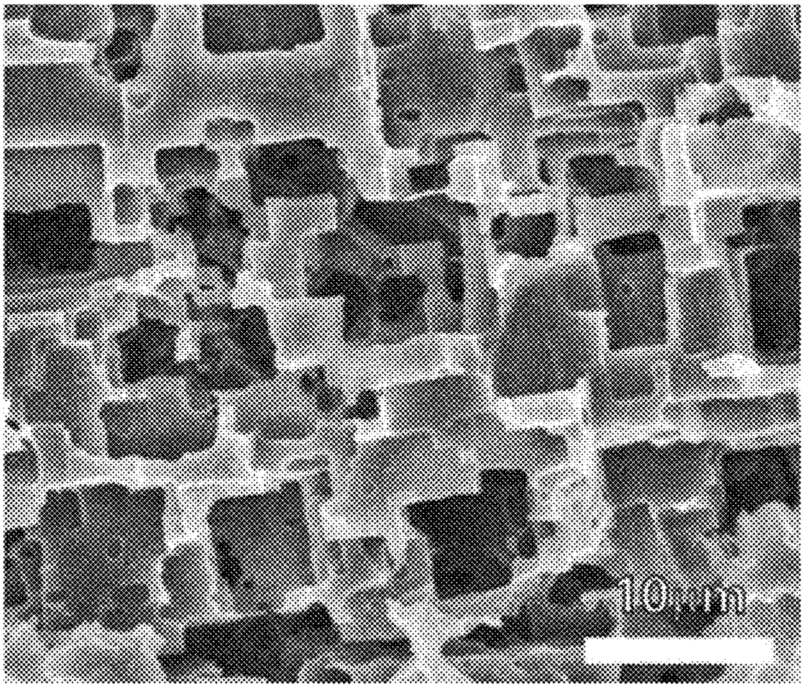
FIG. 13 shows an SEM image of the temperature-responsive hydrophilic-hydrophobic conversion surface produced in one embodiment of the present disclosure.

FIG. 13 shows an SEM image of the temperature-responsive hydrophilic-hydrophobic conversion surface of Production Example 2. Referring to FIG. 13, it can be seen that the surface roughness is high and the slope is steep even after the coating layer has been formed in the case of Production Example 2.

For the temperature-responsive hydrophilic-hydrophobic conversion surface of Production Example 2 above, the water contact angle at low and high temperatures was measured in the same manner as in Experiment Example 4. As a result, it was confirmed that superhydrophobicity was exhibited with the water contact angle at low temperature being 150.2°+1.2°, and a result was found that hydrophilicity was excellent with the water contact angle at high temperature being 39.4°=1.7°.

Accordingly, in the case of Production Example 2 and of forming a coating layer on the surface having the micro/nano-composite structure, it was confirmed that excellent hydrophobicity was exhibited at low temperatures, and that the hydrophilic-hydrophobic conversion property was excellent from the results showing a large difference in water contact angle depending on temperatures.

As above, certain parts of the subject matter of the present disclosure have been described in detail, and it will be clear to those of ordinary skill in the art that this specific description is merely a preferred embodiment and the scope of the present disclosure is not limited thereby. It is therefore said that the substantial scope of the present disclosure will be defined by the appended claims and their equivalents.

What is claimed:

1. A method for forming a temperature-responsive hydrophilic-hydrophobic conversion surface, comprising:

forming a surface having a microstructure by subjecting a metal to surface treatment; and forming a coating layer by applying a coating solution comprising a temperature-responsive phase transition polymer onto the surface having the microstructure, wherein a water contact angle at temperatures of −10° C. or lower of the temperature-responsive hydrophilic-hydrophobic conversion surface is 100° or more, and the water contact angle at temperatures of 50° C. or higher is 80° or less.

2. The method for forming a temperature-responsive hydrophilic-hydrophobic conversion surface of claim 1, wherein the metal comprises one or more selected from the group consisting of aluminum, aluminum alloys, magnesium, magnesium alloys, titanium, titanium alloys, copper, and copper alloys.

3. The method for forming a temperature-responsive hydrophilic-hydrophobic conversion surface of claim 1, wherein the surface treatment is performed by one or more methods selected from the group consisting of acid treatment, alkali treatment, plasma treatment, ultraviolet treatment, and exposure using a photoresist.

4. The method for forming a temperature-responsive hydrophilic-hydrophobic conversion surface of claim 3, wherein the acid treatment is performed by immersing the metal in a hydrochloric acid solution of a concentration of 1 to 6M for 1 to 30 minutes.

5. The method for forming a temperature-responsive hydrophilic-hydrophobic conversion surface of claim 1, wherein the microstructure has an aspect ratio of 0.55 or more.

6. The method for forming a temperature-responsive hydrophilic-hydrophobic conversion surface of claim 1, wherein the surface having the microstructure has an arithmetic mean height (Sa) of 1 or more.

7. The method for forming a temperature-responsive hydrophilic-hydrophobic conversion surface of claim 1, wherein the temperature-responsive phase transition polymer is a lower critical solution temperature (LCST) polymer or an upper critical solution temperature (UCST) polymer.

8. The method for forming a temperature-responsive hydrophilic-hydrophobic conversion surface of claim 1, wherein the temperature-responsive phase transition polymer comprises one or more lower critical solution temperature polymers selected from the group consisting of poly(N-isopropylacrylamide (pNIPAAm), poly (N,N-diethylacrylamide (pDEAM), poly(methyl vinyl ether) (pMVE), poly(2-ethoxyethyl vinyl ether) (pEOVE), poly(N-vinylcaprolactam) (pNVCa), poly (N-vinylisobutyramide) (pNVIBAM), poly(N-vinyl-n-butyramide) (pNVBAM), and poly(N-ethylmethacrylamide) (pNEMAM).

9. The method for forming a temperature-responsive hydrophilic-hydrophobic conversion surface of claim 1, wherein the temperature-responsive phase transition polymer comprises one or more upper critical solution temperature polymers selected from the group consisting of polycaprolactone (PCL), poly(N-acryloylglycinamide-co-acrylonitrile) (poly(NAGA-AN), poly(N-acryloylasparaginamide) (PNAAAm), poly(2-hydroxyethylmethacrylate) (PHEMA), and poly-3-dimethyl(methacryloyloxyethyl)ammonium propane sulfonate (PDMAPS).

10. The method for forming a temperature-responsive hydrophilic-hydrophobic conversion surface of claim 1, wherein the temperature-responsive phase transition polymer has a concentration of 5 to 100 g/L in the coating solution.

11. The method for forming a temperature-responsive hydrophilic-hydrophobic conversion surface of claim 1, wherein the coating layer has a thickness of 0.5 to 5 μm.

12. A temperature-responsive hydrophilic-hydrophobic conversion surface, comprising:

a surface having a microstructure; and a coating layer formed on the surface having the microstructure and comprising a temperature-responsive phase transition polymer, wherein a water contact angle at temperatures of −10° C. or lower of the temperature-responsive hydrophilic-hydrophobic conversion surface is 100° or more, and the water contact angle at temperatures of 50° C. or higher is 80° or less.

13. The temperature-responsive hydrophilic-hydrophobic conversion surface of claim 12, wherein the temperature-responsive hydrophilic-hydrophobic conversion surface is a surface of heat exchanger fins.

14. A heat exchanger comprising heat exchanger fins having a temperature-responsive hydrophilic-hydrophobic conversion surface, wherein the temperature-responsive hydrophilic-hydrophobic conversion surface comprises a surface having a microstructure, and a coating layer formed on the surface having the microstructure and comprising a temperature-responsive phase transition polymer, and wherein a water contact angle at temperatures of −10° C. or lower of the temperature-responsive hydrophilic-hydrophobic conversion surface is 100° or more, and the water contact angle at temperatures of 50° C. or higher is 80° or less.

* * * * *